United States Patent [19]

Rademachers et al.

[11] Patent Number: 5,032,377

[45] Date of Patent: Jul. 16, 1991

[54] CHROMIUM OXIDE GREEN, A PROCESS FOR ITS PRODUCTION AND ITS USE

[75] Inventors: Jakob Rademachers; Hans-Ulrich Höfs, both of Krefeld, Fed. Rep. of Germany

[73] Assignee: Bayer Aktiengesellschaft, Leverkusen-Bayerwerk, Fed. Rep. of Germany

[21] Appl. No.: 357,998

[22] Filed: May 30, 1989

[30] Foreign Application Priority Data

Jun. 10, 1988 [DE] Fed. Rep. of Germany ....... 3819779

[51] Int. Cl.$^5$ .................................. C01G 37/02
[52] U.S. Cl. ...................... 423/607; 423/53; 106/400
[58] Field of Search ............... 423/53, 607; 106/400

[56] References Cited

U.S. PATENT DOCUMENTS

| | | | |
|---|---|---|---|
| 524,470 | 8/1894 | Slocum | 423/607 |
| 1,158,379 | 10/1915 | Gessler | 423/607 |
| 1,429,912 | 9/1922 | D'Adrian | 423/607 |
| 1,723,556 | 8/1929 | Meyer | 423/607 |
| 1,738,780 | 12/1929 | Low | 423/607 |
| 1,866,608 | 7/1932 | Wurszschmitt | 423/607 |
| 1,893,761 | 1/1933 | Caspari | 423/607 |
| 1,968,599 | 7/1934 | Demant | 423/607 |
| 2,000,135 | 5/1935 | Henglein et al. | 423/607 |
| 2,209,907 | 7/1940 | Tarr | 423/607 |
| 2,347,496 | 8/1944 | Muskat et al. | 423/607 |
| 2,544,687 | 3/1951 | Kalbach | 423/607 |
| 2,695,215 | 11/1954 | Pollock | 423/607 |
| 3,065,095 | 11/1962 | Foos et al. | 423/607 |
| 3,190,723 | 6/1965 | Jacobson | 423/607 |
| 3,347,798 | 10/1967 | Baer et al. | 252/448 |
| 3,373,013 | 3/1968 | Hardy et al. | 423/607 |
| 3,486,913 | 12/1969 | Zirnibl et al. | 423/607 |
| 3,950,183 | 4/1976 | Weber et al. | 106/309 |
| 4,040,860 | 8/1977 | Mansmann et al. | 423/596 |
| 4,045,544 | 8/1977 | Williston et al. | 423/607 |
| 4,235,862 | 11/1980 | Rambold et al. | 423/607 |

FOREIGN PATENT DOCUMENTS 0035751 9/1981 .

OTHER PUBLICATIONS

Chemical Abstract 112:80470x.
Chemical Abstracts, vol. 106, No. 14, Apr. 1987, p. 315 (107059k).

*Primary Examiner*—Theodore Morris
*Assistant Examiner*—Edward Squillante
*Attorney, Agent, or Firm*—Connolly and Hutz

[57] ABSTRACT

Chromium oxide green in the form of donut-shaped, ring-shaped or tire-shaped particles having an internal diameter of from 0.01 to 0.5 mm and an external diameter of from 0.05 to 1.0 mm is prepared by spraying an aqueous chromium oxide green suspension through a liquid pressure nozzle into a spray dryer such that the suspension entering the drying space of the spray dryer is rotating.

2 Claims, 1 Drawing Sheet

CHROMIUM OXIDE GREEN, A PROCESS FOR ITS PRODUCTION AND ITS USE

This invention relates to an improved chromium oxide green, to a process for its production and to its use.

BACKGROUND OF THE INVENTION

Chromium oxide green is an important inorganic product. By virtue of its color fastness and its thermal stability, it is used in particular both as a colored pigment and as a starting material for the production of refractory bricks. Chromium oxide is also used as a raw material in the production of chromium metal and chromium carbide. By virtue of the extreme hardness of the chromium oxide crystallizing in the corundum lattice, it is also used in different formulations as a polish or abrasive.

On an industrial scale, chromium oxide is produced by reduction of alkali chromates with sulfur, sulfur-containing compounds, carbon or carbon-containing compounds or with hydrogen at temperatures around 1000° C. The chromium oxide green, which is dried after the salts have been washed out, is normally marketed in the form of a ground powder.

Handling of the powder during subsequent processing is complicated by dust emission and poor flow behavior which is a disadvantage, above all, in metering and mixing processes.

Accordingly, the industry concerned with subsequent processing requires a chromium oxide green which does not have any of these disadvantages.

Accordingly, the object of the present invention is to provide an improved chromium oxide green which is not attended by and of the described disadvantages.

BRIEF DESCRIPTION OF THE INVENTION

It has now been found that these requirements are satisfied by a chromium oxide green in predominantly ring or tire form. These rings or tires preferably have an internal free diameter of from 0.01 to 0.5 mm and an external diameter of from 0.05 to 1.0 mm.

DETAILED DESCRIPTION OF THE INVENTION

Figure 1:
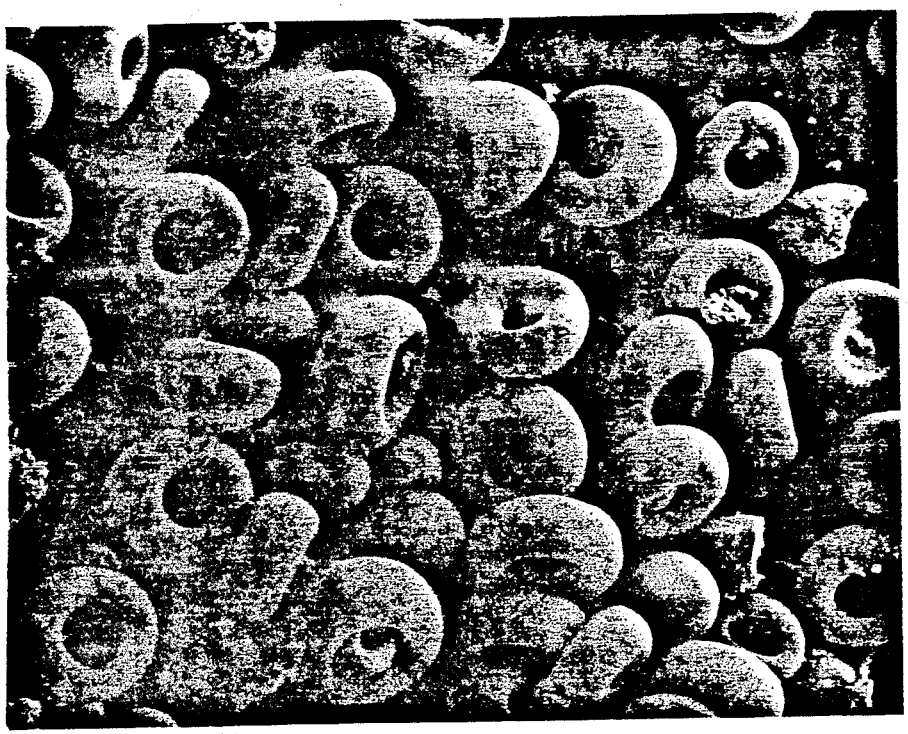
FIG. 1 is a photomicrograph of a plurality of the toroidal-shaped chromium oxide green particles of the present invention.
Figure 2:
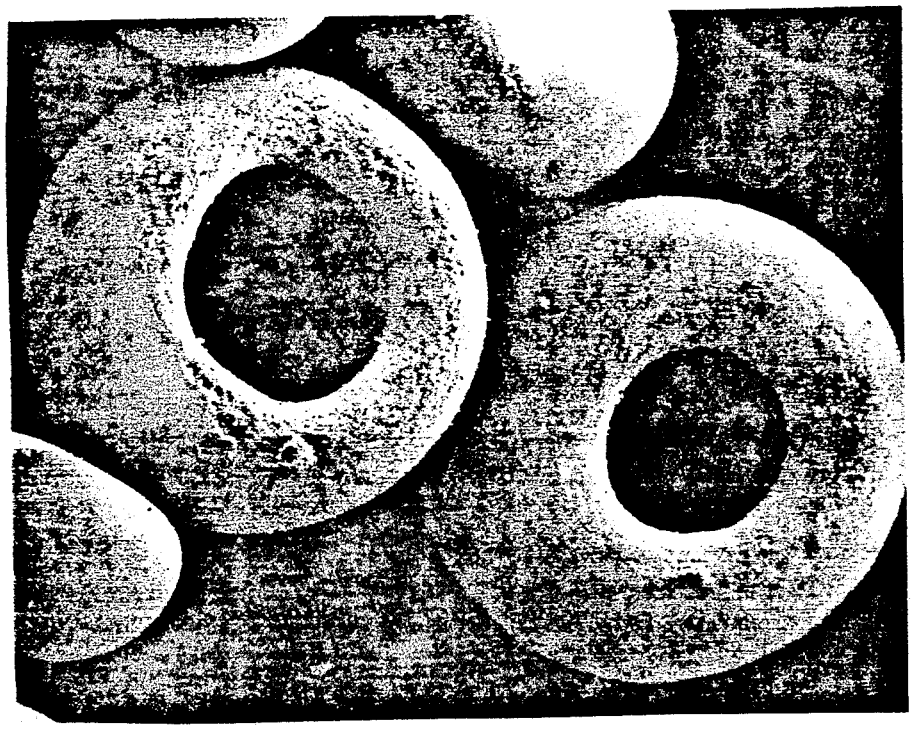
FIG. 2 is a higher magnification photomicrograph of two of the toroidal-shaped structures of the present invention.

The present invention relates to a new form of chromium oxide green particles which are toroidal in shape and have an internal diameter of from 0.01 to 0.5 mm and an external diameter of from 0.05 to 1.0 mm. The toroidal shape of the chromium oxide green particles affords several distinct advantages over the known ground powder of chromium oxide.

The chromium oxide green according to the present invention is distinguished by the fact that, in mixtures with finely divided metal oxides, for example aluminum or magnesium oxide, it shows relatively little tendency towards separation because this free volume within the rings of tires consisting of chromium oxide green can be filled with the more finely divided metal oxide.

The chromium oxide green according to the invention is also easier to disperse in liquid phase then spherical materials because it has larger surfaces to attack, thus facilitating size reduction by the mixing tools.

The present invention also relates to a process for the production of the chromium oxide green according to the invention.

The process according to the invention is characterized in that an aqueous chromium oxide green suspension is sprayed through a liquid pressure nozzle into a spray dryer in such a way that the suspension flowing into the drying space is set rotating. The suspension may be set rotating, for example, by tangential spin slots in the circulation space of the nozzle.

The concentration of the chromium oxide suspension should be between 40 and 80% by weight and preferably between 50 and 70% by weight. The optimal primary particle size of the chromium oxide green used is between 0.05 and 5.0 $\mu$m and preferably between 0.1 and 1.0 $\mu$m. The BET surface, as measured in accordance with DIN 66 131, Section 6, October 1973 (after heating at 130° C. in a stream of nitrogen, adsorption at the temperature of liquid nitrogen, 5-point method, assumed surface requirement of a nitrogen molecular 0.162 nm$^2$) should be between 1 and 20 m$^2$/g.

In one particularly preferred embodiment which leads to particularly pronounced rings or tires, from 0.1 to 2.0% by weight, based on chromium oxide green, of a dispersion aid, for example an alkali or ammonium salt of a polyacrylic acid, a polyphosphoric acid or a lignin sulfonic acid, is added to the chromium oxide suspension.

Where chromium oxide suspensions are used in the process according to the invention, the described rings and tires are surprisingly obtained in by far the majority. Where other inorganic pigments, for example iron oxide, iron oxide hydroxide, titanium dioxide or zinc oxide, were used, it was not possible to observe the rings or tires according to the invention. Instead, the known spherical particles were obtained.

Both powder-form chromium oxide green in aqueous suspension and also washed filter cake from the production process may be used for the spray drying step.

In the spray drying process, atomizing discs are normally used to atomize pigment suspensions. However, nozzles have also been used for finely dispersing the suspension in the spray dryer. The nozzles used are mostly two-component nozzles using a compressed gas, for example air or steam. One-component nozzles, by which the suspensions used are finely dispersed under their own liquid pressure, are also used in spray drying. According to the invention, the improved chromium oxide green is only obtained in the form of rings or tires when a liquid pressure nozzle is used, preferably with a spray pattern in the form of a circular hollow cone. The liquid is delivered centrally to the nozzle, set rotating at high speed by tangential spin slots in the circulation space and is atomized after issuing through the nozzle orifice. Nozzles having a spray angle of 15° to 60° are preferably used. The bore diameter is determined by the required throughput and may be between 0.1 and 20 mm. Similarly, the liquid pressure may be between 0.25 and 10 bar.

The process for the production of the improved chromium oxide green according to the invention may be carried out in any suitable dryers. It is advisable in this regard to work with the highest possible temperatures of the drying gas which should be of the order of 500°

C. The gas outlet temperatures should be as low as possible, i.e. from 120° to 80° C., to ensure effective heat utilization.

It is also of advantage to use a jet dryer operating on the fountain principle because the residence times during drying are longer in this case.

The present invention also relates to the use of the chromium oxide green according to the invention for the production of chromium metal, chromium carbide, refractory materials, for the pigmenting of substrates, for example concrete parts, plasters, paints or plastics and as abrasives or polishes.

The following Examples are intended to illustrate the process according to the invention without limiting it in any way.

EXAMPLE 1

100 kg Chromoxidgrün GN (a commercial product of Bayer AG), BET surface 4 $m^2/g$, are homogeneously stirred with 66 kg water and 0.75 kg Polystabil-S 312 solution (a product of Chem. Fabrik Stockhausen GmbH), corresponding to 0.3 kg Na polyacrylate. By means of an eccentric screw pump, the suspension obtained is delivered in a quantity of approximately 50 kg/h to a spray dryer which has a diameter of 1.00 m for a height of 5.20 m in the cylindrical part and is equipped with a liquid pressure nozzle of the type manufactured by Gustav Schlick GmH and Co. (type 100, bore 0.8 mm, spray angle 30°). The liquid pressure in front of the nozzle is kept at 5.0 bar. The temperatures of the burner gases are 530° C. at the dryer entrance and 80° C. at the dryer exit. The dry material obtained, which has an apparent density of 1.6 g/ml, shows good flow properties (flow time from DIN cup 4=54 seconds, DIN 53 211), has no tendency towards dust emission and consists predominantly (approximately 90%) of rings and tires having an internal diameter of from 40 to 120 $\mu$m and an external diameter of from 100 to 250 $\mu$m.

EXAMPLE 2

100 kg Chromoxidgrün-Versuchsprodukt PK 5304 (a product of Bayer AG), BET surface approximately 10 $m^2/g$ were mixed and dried as in Example 1. The dried material obtained again consisted predominantly of rings and tires. It had an apparent density of 1.39 g/ml and a flow time (DIN cup 4) of 55 seconds.

EXAMPLE 3

133 kg of a filter cake having a solids content of 75% by weight of calcined and washed raw material for Chromoxidgrün GX (a product of Bayer AG) were diluted with 33 kg water to a solids content of 60% by weight and further treated as described in Example 1. A free-flowing, non-dust-emitting dry material having the same ring and tire dimensions as in Example 1 was obtained.

COMPARISON EXAMPLE 1

100 kg of iron oxide yellow Bayferrox 920, (a product of Bayer AG) were treated in the same way as Example 1, except for the solids concentration which was adjusted to 40% by weight in view of the necessary pumpability of the suspension. The typical spherical particles with indentations (diameter between 100 and 300 $\mu$m) known from spray drying were obtained as the dry material.

COMPARISON EXAMPLE 2

100 kg Bayertitan R-FK 2 (a titanium dioxide pigment made by Bayer AG) were homogeneously with 66 kg water as in Example 1, the same quantity of Polystabil-S 312 solution was added to the resulting mixture, followed by drying. The dry material obtained consisted of microspheres with indentations. The diameter of the microspheres was between 50 and 300 $\mu$m.

COMPARISON EXAMPLE 3

100 kg Zinkoxid aktiv (a product of Bayer AG) were mixed with 300 kg water to form a paste to which 0.75% by weight Polystabil-S 312 solution was added, followed by further processing as in Example 1. Microspheres between 50 and 200 $\mu$m in diameter were obtained.

What is claimed is:

1. Chromium oxide green in the form of toroidal-shaped particles.

2. Chromium oxide green as claimed in claim 1 wherein the particles have an internal free diameter of from 0.01 to 0.5 mm and an external diameter of from 0.05 to 1.0 mm.

* * * * *